(12) United States Patent
Cao et al.

(10) Patent No.: US 7,462,651 B2
(45) Date of Patent: *Dec. 9, 2008

(54) RADIATION-CURABLE DESICCANT-FILLED ADHESIVE/SEALANT

(75) Inventors: Jie Cao, Hillsborough, NJ (US); Donald E. Herr, Doylestown, PA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/393,496

(22) Filed: Mar. 30, 2006

(65) Prior Publication Data

US 2007/0043136 A1 Feb. 22, 2007

Related U.S. Application Data

(63) Continuation-in-part of application No. 11/098,117, filed on Apr. 4, 2005.

(51) Int. Cl.
*C08F 2/46* (2006.01)
*C08F 2/50* (2006.01)
*B29C 65/14* (2006.01)
*B29C 65/48* (2006.01)

(52) U.S. Cl. .............. 522/74; 522/71; 522/83; 522/90; 522/96; 522/100; 522/104; 522/107; 522/168; 522/170; 522/181; 522/77; 522/79; 522/81; 522/82; 156/272.2; 156/275.1; 156/275.3; 156/326; 156/325; 156/327; 156/330; 156/331.1; 156/275.7; 428/1.1; 428/1.5; 428/1.53; 428/1.55; 428/345; 428/355 R; 428/355 EP; 428/355 AC; 428/508

(58) Field of Classification Search .......... 522/90, 522/96, 100, 104, 107, 168, 170, 71, 74, 522/83; 524/107, 114; 156/272.2, 275.1, 156/275.3, 326, 325, 327, 330, 331.1; 428/1.1, 428/1.5, 345, 355 R, 355 EP, 508, 355 AC, 428/1.55

See application file for complete search history.

(56) References Cited

U.S. PATENT DOCUMENTS

| | | |
|---|---|---|
| 2,830,721 A | 4/1958 | Pinsky et al. |
| 4,265,976 A | 5/1981 | Nowak |
| 4,394,403 A | 7/1983 | Smith |
| 5,008,137 A | 4/1991 | Nugent, Jr. et al. |
| 5,171,760 A | 12/1992 | Kaszas et al. |
| 5,300,541 A | 4/1994 | Nugent, Jr. et al. |
| 5,491,204 A | 2/1996 | Nugent, Jr. et al. |
| 5,665,823 A | 9/1997 | Saxena et al. |
| 5,703,394 A | 12/1997 | Wei et al. |
| 5,747,363 A | 5/1998 | Wei et al. |
| 5,827,908 A | 10/1998 | Arai et al. |
| 6,054,549 A | 4/2000 | Bahadur et al. |
| 6,211,320 B1 | 4/2001 | Dershem et al. |
| 6,692,610 B2 | 2/2004 | Low et al. |
| 6,692,986 B1 | 2/2004 | Bayer et al. |
| 6,706,779 B2 | 3/2004 | Bahadur et al. |
| 6,833,668 B1 | 12/2004 | Yamada et al. |
| 6,835,950 B2 | 12/2004 | Brown et al. |
| 6,897,474 B2 | 5/2005 | Brown et al. |
| 6,936,131 B2 | 8/2005 | McCormick et al. |
| 2003/0062125 A1 | 4/2003 | Takamatsu et al. |
| 2003/0144430 A1 | 7/2003 | Liu et al. |
| 2003/0190484 A1 | 10/2003 | Kashiwagi et al. |
| 2004/0084686 A1 | 5/2004 | Wang et al. |
| 2004/0225025 A1 | 11/2004 | Sullivan et al. |

FOREIGN PATENT DOCUMENTS

| | | |
|---|---|---|
| EP | 0197458 B1 | 11/1991 |
| EP | 0951947 A1 | 10/1999 |
| JP | 56079170 A | 11/1979 |
| JP | 06 322072 | 11/1994 |
| JP | 08 208774 | 8/1996 |
| JP | 2003147051 A | 11/2001 |
| JP | 2003-327951 A2 | 11/2003 |
| JP | 2005302401 A | 4/2004 |
| JP | 2005019269 A | 1/2005 |
| WO | WO2004/009720 A2 | 1/2004 |

OTHER PUBLICATIONS

Vara, Fulvio J., et al., Proceedings of the Water-Borne and Higher Solids Coatings Symposium, 1990, 17th, pp. 9-29.

Crivello, James V., et al., "Proceedings from Radiation Curing," Chicago, IL, Sep. 1982, pp. 4-28.

Kim, Gi Heon, et al., "Encapsulation of Organic Light-Emitting Devices by Means of Photopolymerized Polyacrylate Films," Science Direct, 2004, pp. 1879-1883.

Lange, J. et al, Influence of structure and chemical composition on oxygen permeability . . . , 2002, Elsevier Science Ltd., pp. 5985-5994.

Weinmann, D.J. et al, Amine-Functional Curatives for Low Temperature Cure Epoxy Coatings, 2001, ResolutionPerformance Products, LLC, pp. 2-16.

(Continued)

*Primary Examiner*—Sanza L McClendon
(74) *Attorney, Agent, or Firm*—Jane E. Gennaro (57) ABSTRACT

A radiation-curable desiccant-filled adhesive/sealant composition comprising a radiation-curable resin, one or more desiccant fillers, one or more photoinitiators or photosensitizers, and optionally, one or more inorganic or organic fillers.

13 Claims, 4 Drawing Sheets

OTHER PUBLICATIONS

Liao, Tung-Ping et al, New Telechelic Polymers and Sequential Copolymers by Polyfunctional . . . , 1981, Polymer Bulletin 6, pp. 135-141.

Ivan, Bela et al, Living Carbocationic Polymerization—XX. Synthesis of Allyl-Telechelic . . . Instit. of Polymer Science, Univ. of Akron, pp. 869-872, 1988.

Ivan, Bela et al, Living Carbocationic Polymerization—XXX. One-Pot Synthesis of Allyl-Terminated . . . 1990, Journal of Polymer Science, pp. 90-115.

Pernecker, Tibor et al, Macromers by Carbocationic Polymerization . . . , 1991, Polymer Bulletin 25, pp. 633-640.

Merrill, Natalie A. et al, Radiation Curing of Butyl Polymers for Pressure Sensitive Adhesives (Abstract), Exxon Chemical Co., pp. 77-86.

Bahadur, Maneesh et al, UV Curable Polyisobutylene Oligomers for Photonic Applications (Abstract), 2004, Dow Corning Corp., Midland, MI, USA.

FIGURE 1  CALCIUM-BUTTON DEVICE

BH: bondline height (thickness).
BW: bondline width.
Glass: substrate
Lid: glass or metal lid

FIGURE 3. COMPARISON OF Ca-BUTTON DECAY RATE OF THIOL-ENE SEALANTS/ADHESIVES (NOTE: THE CONTRAST VARIATION FROM THE BUTTON OF 5-C SAMPLE WAS CAUSED BY A MARKER WRITTEN ON THE BACK SIDE OF THE GLASS)

Figure 4. Ca-button decay vs. time on the devices using Desiccant-filled cationic epoxy barrier sealants

RADIATION-CURABLE DESICCANT-FILLED ADHESIVE/SEALANT

RELATED APPLICATIONS

This application is related to U.S. patent applications with Ser. Nos. 11/098,115, 11/098,116, and 11/098,117. This application is a continuation in part of U.S. patent application Ser. No. 11/098,117 filed Apr. 4, 2005.

This Invention was made with support from the Government of the United States of America under Agreement No. MDA972-93-2-0014 awarded by the Army Research Laboratories. The Government has certain rights in the Invention.

FIELD OF THE INVENTION

This invention relates to radiation-curable desiccant-filled adhesives or sealants. In a preferred embodiment, it relates to desiccant-filled perimeter adhesives and sealants for electronic and optoelectronic devices, such as organic light emitting diodes.

BACKGROUND OF THE INVENTION

It is well known that a variety of packaged electronic and optoelectronic devices require moisture protection to achieve a specified operating or storage lifetime. In particular, the relative humidity within the encapsulated packages of highly moisture-sensitive electronic and optoelectronic devices, such as organic light-emitting devices (OLED), polymer light-emitting devices, charge-coupled device sensors (CCD), liquid crystal displays (LCD), electrophorectic displays, and micro-electro-mechanical sensors (MEMS), must be controlled below a certain level, particularly below 1000 ppm or even in some cases below 100 ppm, in order to fully protect the organic light-emitting layers, electrodes, or other moisture-sensitive components.

There are several approaches used in the prior art to protect encapsulated or packaged devices from water. These techniques do not always work: organic sealants may not meet the stringent moisture permeation requirement; moisture impermeable solder sealants may have melting temperatures that are too high for temperature sensitive devices; and desiccant packages attached on the device inner wall may block light emission out of the device, a particular problem for top-emitting organic light-emitting diodes.

SUMMARY OF THE INVENTION

This invention is a radiation-curable desiccant-filled material that has the properties of both a sealant and an adhesive, hereinafter, sealant/adhesive. These materials are suitable for sealing highly moisture-sensitive electronic, optoelectronic, or similar devices. In these sealant/adhesive compositions the material not only acts as a moisture barrier, but also absorbs, adsorbs, or chemically reacts with any permeating water or water vapor. The materials are capable of bonding two substrates together to form a sealed enclosure after radiation curing of the adhesive.

The radiation-curable desiccant-filled adhesive/sealant comprises (a) one or more radiation curable resins; (b) one or more fillers that absorb, adsorb, or chemically react with water or water vapor; (c) one or more photoinitiators and/or photosensitizers;

Optionally, the adhesive/sealant may also contain one or more reactive or non-reactive resins, one or more inorganic fillers, or one or more adhesion promoters.

DETAILED DESCRIPTION OF THE INVENTION

All references cited herein are incorporated in their entirety by reference. In this specification the term radiation curing refers to the cure of a resin or resin/filler system through exposure to actinic radiation. Actinic radiation is electromagnetic radiation that induces a chemical change in a material, and for purposes within this specification and claims will include electron-beam curing. In most cases, such radiation is ultraviolet (UV) or visible light. The initiation of this cure is achieved through the use of an appropriate photoinitiator.

Suitable radiation-curable resins include any of the radiation-curable resins known to those with experience in the field of UV curable materials and filled polymer composites. The resins may be small molecules, oligomers, or polymers, and will be chosen by the practitioner as appropriate for the end use application. The particular desiccant filler chosen may also be varied depending on the moisture scavenging and moisture barrier requirements needed for a particular optoelectronic or electronic device. The cure mechanism also may vary (cationic, radical, etc.), although preferably it will be compatible with the fillers and desiccant fillers used (for example, some alkaline desiccants or fillers may inhibit a cationically UV curable resin system).

Although the materials used for these compositions are known, the essence of this invention resides in the formulation of an adhesive/sealant that is filled with desiccant and that is curable by radiation.

The backbone of the radiation-curable resins is not limited. The reactive functionalities on the resins will be those reactive to the initiators or catalysts formed by exposure to radiation and include, but are not limited to, epoxies, selected from glycidyl epoxy, aliphatic epoxy, and cycloaliphatic epoxy; oxetane; acrylate and methacrylate; itaconate; maleimide; vinyl, propenyl, crotyl, allyl, and propargyl ether and thioethers of those groups; maleate, fumarate, and cinnamate esters; styrenic; acrylamide and methacrylamide; chalcone; thiol; allyl, alkenyl, and cycloalkenyl groups.

Suitable cationic polymerizable radiation-curable resins include epoxies, oxetanes, vinyl ethers, and propenyl ethers. Representative epoxy resins are glycidyl ethers and cycloaliphatic epoxies, which are commercially available from a number of sources known to those skilled in the art.

Representative aromatic liquid glycidyl ethers include bisphenol F diglycidyl ether (sold under the trade name Epikote 862 from Resolution Performance Products) or bisphenol A diglycidyl ether (sold under the trade name Epikote 828 from Resolution Performance Products). Representative solid glycidyl ethers include tetramethylbiphenyidiglycidyl ether (sold under the trade name RSS 1407) and resorcinol diglycidyl ether (sold under the trade name Erisys RDGE® available from CVC Specialty Chemicals, Inc.). Other aromatic glycidyl ethers are commercially available under the trade names Epon 1031, Epon 164, and SU-8 available from Resolution Performance Products.

Representative non-aromatic glycidyl epoxy resins include an hydrogenated bisphenol A diglycidylether (sold under the trade name EXA-7015 from Dainippon Ink & Chemicals) or cyclohexanedimethylol diglycidyl ether available from Aldrich Chemical Co.

Representative cycloaliphatic epoxy resins include ERL 4221 and ERL 6128 available from Dow Chemical Co. A representative oxetane resin is OXT-121 available from Toagosei. Representative vinyl ether molecules include cyclohexanedimethylol divinyl ether (Rapicure-CHVE), tripropylene glycol divinyl ether (Rapicure-DPE-3) or dodecyl vinyl ether (Rapicure-DDVE) all available from International Specialty Products. Analogous vinyl ethers are also available from BASF.

Suitable radically polymerizable radiation-curable resins include acrylates, maleimides, or thiol-ene based resins. In many cases, combinations of these three resins can be utilized to tailor the properties of the sealant/adhesive material.

Representative acrylate resins include hexane diol diacrylate, trimethylolpropane triacrylate, cyclohexanedimethylol diacrylate, dicyclo-pentadienedimethylol diacrylate, tris(2-hydroxyethyl)isocyanurate triacrylate, ploy(butadiene) dimethacrylate, and bisphenol A based acrylated epoxy. Such resins are commercially available from Sartomer and UCB Chemicals.

Representative liquid maleimide resins are described, for example, U.S. Pat. Nos. 6,265,530, 6,034,194, and 6,034,195, which are incorporated herein in their entirety by this reference. Particularly suitable maleimide resins have the structures in which $(C_{36})$ represents a hydrocarbon moiety having 36 carbons, which can be straight or branched chain, with or without cyclic structures;

and

Representative thiol-ene radically photopolymerizable systems include the pentaerythritoltetrakis(3-mercaptopropionate)/triallyl-isocyanurate system. Other useful thiols include those described in U.S. Pat. No. 5,919,602 issued to MacDermid Acumen, Inc. Other useful polyenes include diallylchlorendate (sold under the trade name BX-DAC) and tetraallylbisphenol A, both available from Bimax, Inc.

Other suitable resins include polyisobutylenes or butyl rubbers containing functional groups that are radiation curable. Representative polyisobutylene acrylates were described in U.S. Pat. No. 5,171,760 issued to Edison Polymer Innovation Corp., U.S. Pat. No. 5,665,823 issued to Dow Corning Corp. and in *Polymer Bulletin*, Vol. 6, pp. 135-141 (1981) written by T. P. Liao and J. P. Kennedy. A representative polyisobutylene epoxy was described in *Polymer Material Science and Engineering*, Vol. 58, pp. 869 (1988) and in *Journal of Polymer Science, Part A, Polymer Chemistry*, Vol. 28 pp. 89 (1990) written by J. P. Kennedy and B. Ivan. A representative polyisobutylene vinyl ether was described in *Polymer Bulletin*, Vol. 25, pp. 633 (1991) written by J. P. Kennedy and coworkers, U.S. Pat. Nos. 6,054,549, 6,706,779B2 issued to Dow Corning Corp. A representative radiation curable butyl rubber was described in RadTech North America proceedings, pp. 77, (1992) written by N. A. Merill, I. J. Gardner and V. L. Hughes. These rubbers contain reactive functionalities that are curable by radiation. Such reactive functionalities include, but are not limited to, those selected from the group consisting of glycidyl epoxy, aliphatic epoxy, cycloaliphatic epoxy; oxetane; acrylate, methacrylate, itaconate; maleimide; vinyl, alkenyl, propenyl, crotyl, allyl, and propargyl ether and thio-ethers of those groups; maleate, fumarate, and cinnamate esters; styrenic; acrylamide and methacrylamide; chalcone; thiol; allyl, alkenyl, and cycloalkenyl groups.

Additional suitable radiation-curable resins, and photoinitiators for those resins, will include those found in literature sources such as Fouassier, J-P., *Photoinitiation, Photopolymerization and Photocuring Fundamentals and Applications* 1995, Hanser/Gardner Publications, Inc., New York, N.Y.

The selection of a photoinitiating system for the inventive radiation curable barrier materials is familiar to those skilled in the art of radiation curing. The photoinitiating system will comprise one or more photoinitiators and optionally one or more photosensitizers. The selection of an appropriate photoinitiator is highly dependent on the specific application in which the barrier sealant is to be used. A suitable photoinitiator is one that exhibits a light absorption spectrum that is distinct from that of the resins, fillers, and other additives in the radiation curable system.

If the sealant must be cured through a cover (or lid) or substrate, the photoinitiator will be one capable of absorbing radiation at wavelengths for which the cover or substrate is transparent. For example, if a barrer sealant is to be cured through a sodalime glass cover plate, the photoinitiator must have significant UV absorbance above ca. 320 nm. UV radiation below 320 nm will be absorbed by the sodalime glass cover plate and not reach the photoinitiator. In this example, it would be beneficial to include a photosensitizer with the photoinitiator into the photoinitiating system, to augment the transfer of energy to the photoinitiator. The nature of the cover or lid is limited only by the application, and may be rigid or flexible. Examples include glass, barrier coated plastics, and steel.

For cationically photopolymerizable systems, the most useful photoinitiators are diaryliodonium salts and triarylsulfonium salts containing anions such as, but not limited to fluorinated anions, such as $BF_4^-$, $PF_6^-$, $AsF_6^-$ or $SbF_6^-$. Commercially available representative iodonium salts include PC2506 (Polyset), UV9380C (GE silicones), and Rhodorsil 2074 (Rhodia). Other suitable cationic photoinitiators are sulfonium salts, a representative sulfonium salt being UVI-6974 (Dow Chemical). Depending on the application, photosensitizers such as isopropylthioxanthone (ITX) and chloropropoxythioxanthone (CPTX), both available from Aldrich and other vendors, are useful in combination with iodonium salt photoinitiators. Radical photoinitiators are available from Ciba Specialty Chemicals and other vendors. Representative useful radical photointiators from Ciba include Irgacure 651, Irgacure 819, and Irgacure 907. Other photoinitiators are disclosed in *Ionic Polymerizations and Related processes*, 45-60, 1999, Kluwer Academic Publishers; Netherlands; J. E. Puskas et al. (eds.). Photoinitiators will be used in amounts ranging from 0.1 wt % to 10 wt %.

Inorganic fillers that are not desiccants (also referred to as non-desiccant fillers within this specification and the claims) may be used to improve the material properties or the rheology of the compositions. There are many such fillers that are useful in the inventive UV curable sealants/adhesives. Representative non-desiccant fillers include, but are not limited to, ground quartz, fused silica, amorphous silica, talc, glass beads, graphite, carbon black, alumina, clays, mica, aluminum nitride, and boron nitride. Metal powders and flakes consisting of silver, copper, gold, tin, tin/lead alloys, and other alloys also are suitable fillers for conductive applications. Organic filler powders such as poly-(tetrachloroethylene), poly(chlorotrifluoroethylene), poly(vinylidene chloride) may also be used. The type and amount of such fillers suitable for use in radiation-curable compositions is within the expertise of the practitioner skilled in the art. Generally, however, such fillers will be present in amounts ranging from 1 wt % to 90 wt %.of the total formulation.

The fillers with desiccant properties (referred to as desiccant fillers within this specification and the claims) suitable for use may be any of those that provide an appropriate moisture scavenging rate, capacity, and residual moisture level (the lowest level of moisture at which the desiccant can actively scavenge water) to meet the allowable moisture level for the specific device. The desiccant fillers will be capable of reacting with, absorbing, or adsorbing water and/or water vapor. A representative list of such desiccants can be found in Dean, J. *Lange's Handbook of Chemistry*, 1999, McGraw Hill, Inc., New York, N.Y., pp. 11.5.

In general, suitable desiccants include but are not limited to metal oxides (such as, CaO, BaO, MgO); other oxides (such as $SiO_2$, $P_2O_5$, $Al_2O_3$); metal hydrides (such as $CaH_2$, NaH, $LiAlH_4$); metal salts (such as $CaSO_4$, $Na_2SO_4$, $MgSO_4$, $CaCO_3$, $K_2CO_3$, and $CaCl_2$); powdered zeolites (such as 4A and 3A molecular sieves); metal perchlorates, such as, $Ba(ClO_4)_2$, $Mg(ClO_4)_2$; superabsorbant polymers, such as, lightly crosslinked poly(acrylic acid); and metals that react with water, such as calcium.

As with any filler, the desiccant filler particle size, particle size distribution, shape, and surface functionality will affect the level to which it can be loaded into a resin system and what rheology may result. Such factors are understood by those skilled in the art and are not otherwise relevant to the current inventive compositions. Blends of the more common non-desiccant fillers disclosed above and these desiccant fillers are contemplated and described within the examples.

A common range for the particle size of the desiccant filler is from 0.001 to 200 micrometers. The practitioner with skill in the art will be able to determine the appropriate particle size range for the resin, rheology, and scavenging rate needed for the particular end use application.

In a further embodiment, this invention is an electronic or optoelectronic device, disposed on a substrate and encapsulated with a lid in which the lid and substrate are bonded together with a desiccant-filled sealant/adhesive, the desiccant-filled sealant/adhesive being as described above in this specification. In one embodiment, the desiccant-filled sealant/adhesive is disposed along the perimeter junction of the substrate and lid. In another embodiment, the desiccant-filled sealant/adhesive is disposed over the entire substrate and lid areas that need to be protected.

EXAMPLES

The moisture barrier performance of perimeter sealants can be evaluated by a test known as the Ca-button test, in which the time is measured for which it takes a thin film of calcium metal encapsulated into a device to decay to a calcium salt through reaction with water. The longer the lifetime of the calcium metal film before decay, the lower the moisture permeation into the device and the better the sealant/adhesive protecting the device.

Figure 1:
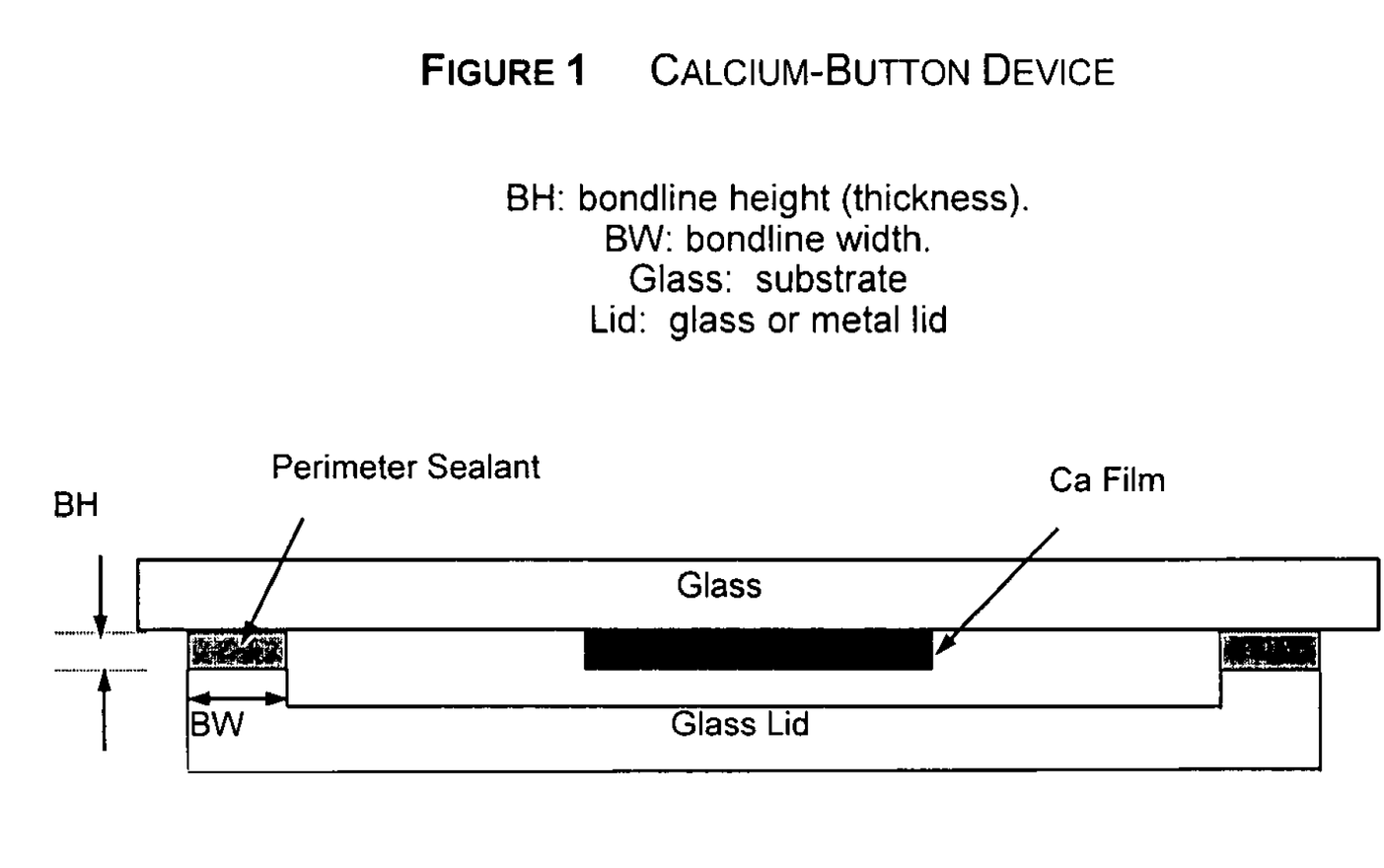
FIG. 1 depicts a calcium button device in which a lid is attached to a substrate with a perimeter sealant disposed at the interface of the perimeter of the lid and the substrate.

A Ca-button device as used in these examples is shown in FIG. 1, in which BH is the bondline height (thickness) of the perimeter sealant/adhesive; BW is the bondline width of the perimeter sealant/adhesive; glass is the substrate on which the calcium metal film is disposed; and lid is the glass or metal lid used to encapsulate the resultant device.

The device was assembled in a $N_2$-filled glove box. A thin Ca film was first evaporated on a glass wafer by vapor deposition to a thickness of 100 nm and a diameter of 8.0 mm. The Ca film was encapsulated by a lid using a perimeter sealant/adhesive that was pre-applied on the lip of the lid. The sealant joint was cured by a UV-radiation spot cure unit to bind the substrate and the lid together with a dose of 3.0 J/cm$^2$ of UV-A radiation.

The sealed Ca-button device was placed in an environment controlled to 65° C./80% RH (relative humidity). Initially, the calcium metal film is a metallic mirror capable of reflecting light. Upon exposure to moisture the metallic film turns to a calcium salt, becomes transparent, and no longer reflects. The calcium film in the button device was continuously monitored by a proprietary reflectance unit in order to identify the time when the calcium metal film was fully decayed. Since moisture can only permeate into the enclosed device through the exposed sealant layer, the lifetime of a Ca-button can be used to evaluate moisture barrier performance.

Example perimeter sealant/adhesive compositions were prepared for water permeability testing using the Ca-bufton test by mixing the composition components in a FlackTek Speedmixer™ immediately before application to the Ca-button device. The compositions were applied to the Ca-button device in a $N_2$ filled glove box to avoid moisture absorption by the Ca-button and desiccants. Each example contains two sample sets representing the same composition both with and without desiccant. Sample compositions (in weight percentages) and results for the Ca-button test for all examples are summarized in Table 1.

Example 1

Formulations were prepared as recited above to contain a diacrylate radiation-curable resin (Sartomer SR833S), a silica filler, and a radical photoinitiator (Irgacure 651). Formulation 1(a) contained no desiccant; formulation 1(b) contained calcium sulfate ($CaSO_4$) as a desiccant. In this example, the device lid was a glass lid (26 mm×15.5 mm X 1.1 mm) (L×W×H) and the perimeter sealant had a 2.5 mm bondline width.

EXAMPLE 1

| COMPONENT | PARTS BY WEIGHT | |
|---|---|---|
| | 4-a | 4-b |
| Sartomer SR833S | 50 | 50 |
| Micron sized silica | 50 | 25 |
| Calcium sulfate | 0 | 25 |
| Irgacure 651 | 0.5 | 0.5 |
| Bond thickness (mil) | 2 | 2 |
| Lifetime (hrs) | 42 | 207 |

Example 2

Formulations were prepared as recited above to contain a mixture of the diacrylate (Sartomer SR833S) and an aliphatic rubber (polyisobutylene Mn=2300), a silica filler, and a radical photoinitiator. Formulation 2(a) contained no desiccant; formulation 2(b) contained $CaSO_4$ as desiccant; formulation 2(c) contained CaO as desiccant. In this example, the device lid was a glass lid (26 mm×15.5 mm×1.1 mm) (L×W×H) and the perimeter sealant had a 2.5 mm bondline width.

EXAMPLE 2

| COMPONENT | PARTS BY WEIGHT | | |
|---|---|---|---|
| | 5-a | 5-b | 5-c |
| Polyisobutylene ($M_n$ = 2300) | 35 | 35 | 35 |
| Sartomer SR833S | 15 | 15 | 15 |
| Micron sized silica | 50 | 25 | 25 |
| Calcium sulfate | 0 | 25 | 0 |
| CaO | 0 | 0 | 25 |
| Irgacure 651 | 0.5 | 0.5 | 0.5 |
| Bond thickness (mil) | 1 | 1 | 8.3 |
| Lifetime (hrs) | 28 | 326 | 252 |

Example 3

Formulations were prepared as recited above to contain a mixture of a radiation-curable (cationic) epoxy resin (Epon 862), a talc filler, a cationic photoinitiator, and a photosensitizer, perylene or (isopropylthioxanthone) (ITX). Formulation 3(a) contained no desiccant; formulation 3(b) contained powdered molecular sieves as desiccant; formulation 3(c) contained powdered molecular sieve as desiccant at a different loading level from 3(b). In this example, the device lid was a stainless steel lid (27mm×27 mm×6.1 mm) (L×W×H) and the perimeter sealant had a 1.3 mm bondline width.

EXAMPLE 3

| COMPONENT | PARTS BY WEIGHT | | |
|---|---|---|---|
| | 6-a | 6-b | 6-c |
| Epon 862 | 39 | 32 | 28 |
| DCPD divinylether | 17 | 21 | 19 |
| Photoinitiator | 0.25 (CD1012) | 3 (UV9380C) | 3 (UV9380C) |
| Photo-sensitizer | 0.75 (Perylene) | 0.15 (ITX) | 0.15 (ITX) |

-continued

EXAMPLE 3

| COMPONENT | PARTS BY WEIGHT | | |
|---|---|---|---|
| | 6-a | 6-b | 6-c |
| Talc | 45 | 23 | 20 |
| Molecular Sieve | 0 | 23 | 33 |
| Bond thickness (mil) | 2 | 3.5 | 2.8 |
| Lifetime (hrs) | 27 | 92 | 52 |

The results are collated and reported in TABLE 1 and indicate that sealant/adhesive formulations containing desiccants show improved moisture barrier performance compared to sealant/adhesive formulations without desiccants, implying that desiccants can effectively absorb moisture within a sealant/adhesive composition and that the lifetime increase is attributable to the moisture absorbing capability of the desiccant, which causes the delay of moisture permeation through the sealant/adhesive. Moreover, no loss of adhesion or other mechanical properties was observed in the formulations containing the desiccants.

TABLE 1

Comparison of Barrier Performance of Sealants/Adhesives Based on Ca-button Lifetime Measurement.

| | Composition in Parts by Weight | | | | | |
|---|---|---|---|---|---|---|
| | | Filler | | | Bondline | Life- |
| Example | Resin | Non-Desiccant | Desiccant | Photo-Initiator | Thickness (mil) | time (hours) |
| 1-a radical cure | 50 | 50 silica | | 0.5 | 2 | 42 |
| 1-b radical cure | 50 | 25 silica | 25 CaSO$_4$ | 0.5 | 2 | 207 |
| 2-a radical cure | 50 | 50 silica | | 0.5 | 1 | 28 |
| 2-b radical cure | 50 | 25 silica | 25 CaSO$_4$ | 0.5 | 1 | 326 |
| 2-c radical cure | 50 | 25 silica | 25 CaO | 0.5 | 8.3 | 252 |
| 3-a cationic cure | 54 | 45 talc | | 1 | 2 | 26 |
| 3-b cationic cure | 52 | 23 talc | 23 molecular sieve | 1.5 | 2 | 92 |
| 3-c cationic cure | 46 | 20 talc | 33 molecular sieve | 1 | 2 | 50 |

Figure 2:
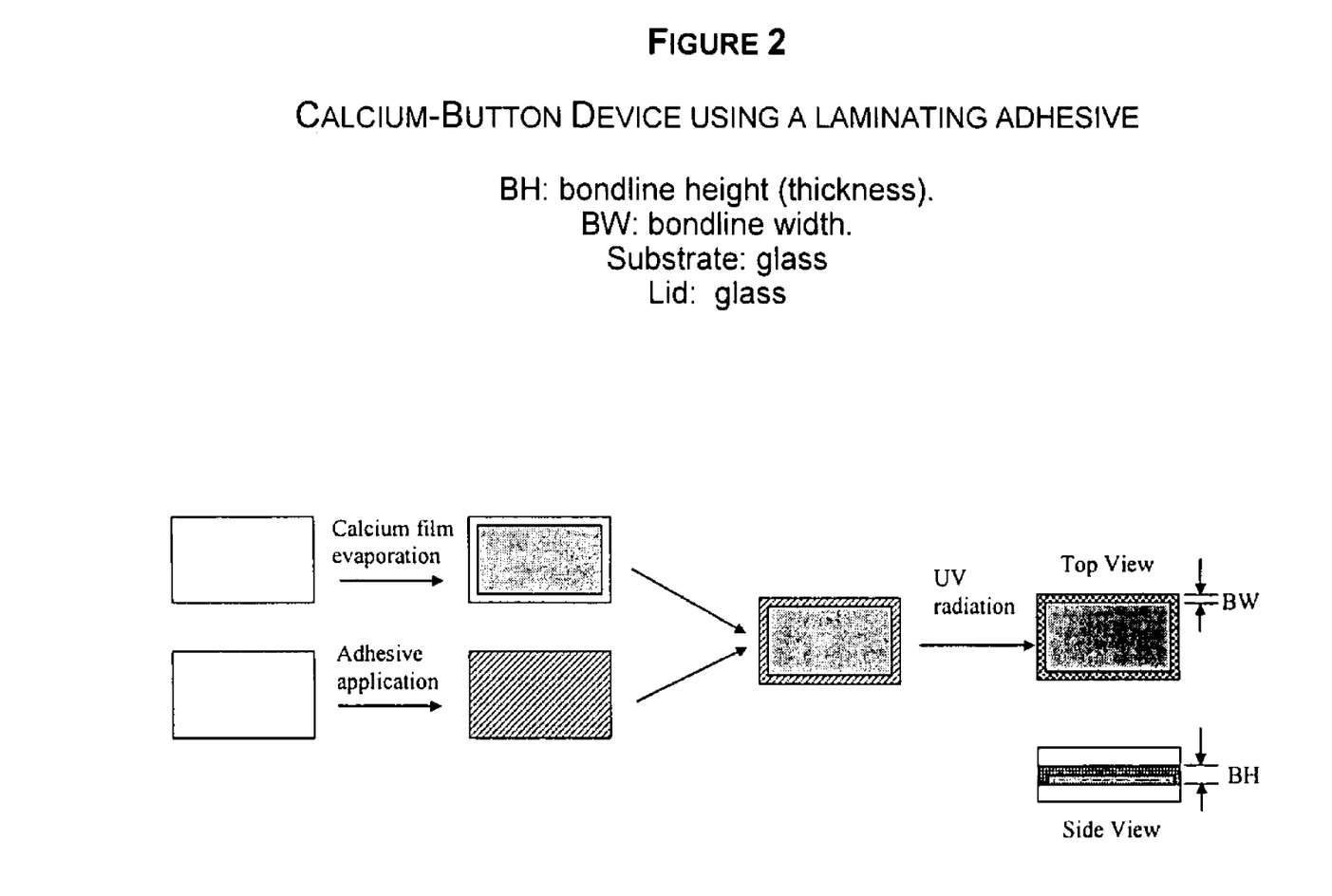
FIG. 2 depicts a Ca button device using a laminating adhesive to bond two substrates together. A layer of Ca film (thickness at 100 nm) was pre-deposited on the selected area of one of the substrates.

The Ca-button test as used for Examples 4 and 5 is shown in FIG. 2, in which in which BH is the bondline height (thickness) of the sealant/adhesive; BW is the bondline width of the sealant/adhesive from the edge of the glass to the Ca film; glass is the substrate on which the calcium metal film is disposed; and lid is the glass lid used to encapsulate the resultant device.

The device was assembled in a N$_2$-filled glove box. A thin Ca film was first evaporated on a glass substrate (26 mm×15.5 mm×1.1 mm) (L×W×H) by vapor deposition to a thickness of 100 nm and a geometry of 23 mm×12.5 mm (L×W). The BW of sealant/adhesive is 1.5 mm. The Ca film was encapsulated by a lid using a sealant/adhesive that was dispensed on whole area of the lid. The sealant joint was cured by a UV-radiation spot cure unit to bind the substrate and the lid together with a dose of 3.0 J/cm$^2$ of UV-A radiation.

The sealed Ca-button device was placed in an environment controlled to 65° C./80%RH (relative humidity). Initially, the calcium metal film is a non-transparent metallic film. Upon exposure to moisture permeating in through the edge of seal, the metallic film turns to a calcium salt and becomes transparent. Thus, the area of the metallic film becomes smaller with time. The area of the calcium film in the button device in Examples 4 and 5 was periodically monitored and measured in order to identify the time when the area of the calcium metal film deteriorated to 70% of its original area. This time period is defined as the Ca-button lifetime. Since moisture can only permeate into the enclosed device through the exposed sealant layer, the lifetime of a Ca-button can be used to evaluate moisture barrier performance.

Example sealant/adhesive compositions were prepared for water permeability testing using the Ca-button test by mixing the composition components in a FlackTek Speedmixer™ and degassing before application to the Ca-button device. The compositions were applied to the Ca-button device in a N$_2$ filled glove box to avoid moisture absorption by the Ca-button and desiccants. Each example contains two sample sets representing the same composition both with and without desiccant.

Example 4

Formulations were prepared as recited above to contain a radiation-curable polyisobutylene diacrylate resin (M.=5300, 70 part by weight), which was prepared from the method developed in J. P. Kennedy's group (T. P. Liao and J. P. Kennedy, *Polymer Bulletin*, Vol. 6, pp. 135-141 (1981)), a diacrylate resin (Sartomer SR833S, 30 part by weight), a desiccant (50 part by weight), and a radical photoinitiator (Irgacure 651, 0.3 part by weight). As shown in Table 2, formulation 4(a) contained no desiccant, formulation 4(b) contained molecular sieve (average particle size: 5 μm) as a desiccant, formulation 4(c) contained calcium sulfate (average particle size 25 μm) as a desiccant, formulation 4(d) contained calcium oxide (average particle size: 10 μm) as a desiccant, formulation 4(e) contained calcium chloride (ACS powder) as a desiccant, formulation 4(f contained aluminum oxide (average particle size: 3 μm) as a desiccant, formulation 4(g) contained potassium carbonate (average particle size: 43 μm) as a desiccant, formulation 4(h) contained magnesium oxide (average particle size: 43 μm) as a desiccant. In this example, the device lid was a glass (26 mm×15.5 mm×1.1 mm) (L×W×H) and the sealant/adhesive had a 1.5 mm bondline width.

TABLE 2

Comparison of Barrier Performance of Sealants/Adhesives Based on Ca-button Lifetime Measurement as described in FIG. 2

| | Composition in Parts by Weight | | | | | |
|---|---|---|---|---|---|---|
| | | Filler | | | Bondline | Life- |
| Example | Resin | Non-Desiccant | Desiccant | Photo-Initiator | Thickness (mil) | time (hours) |
| 4-a radical cure | 100 | | | 0.3 | 1.3 | 88 |
| 4-b | 100 | | 50 | 0.3 | 2.6 | 1225 |

TABLE 2-continued

Comparison of Barrier Performance of Sealants/Adhesives Based on Ca-button Lifetime Measurement as described in FIG. 2

Composition in Parts by Weight

| Example | Resin | Filler Non-Desiccant | Desiccant | Photo-Initiator | Bondline Thickness (mil) | Lifetime (hours) |
|---|---|---|---|---|---|---|
| radical cure |  |  | Molecular Sieve |  |  |  |
| 4-c radical cure | 100 |  | 50 | 0.3 | 1.6 | 600 |
| 4-d radical cure | 100 |  | Calcium CaSO$_4$ 50 | 0.3 | 5.1 | 232 |
| 4-e radical cure | 100 |  | CaO 50 | 0.3 | 5.6 | 191 |
| 4-f radical cure | 100 |  | CaCl$_2$ 50 | 0.3 | 3.2 | 160 |
| 4-g radical cure | 100 |  | Al$_2$O$_3$ 50 | 0.3 | 3.5 | 170 |
| 4-h radical cure | 100 |  | K$_2$CO$_3$ 50 | 0.3 | 1.9 | 126 |
|  |  |  | MgO |  |  |  |

The results indicate that sealant/adhesive formulations containing desiccants show improved moisture barrier performance compared to sealant/adhesive formulations without desiccants, implying that desiccants can effectively absorb moisture within a sealant/adhesive composition and that the lifetime increase is attributable to the moisture absorbing capability of the desiccant, which desiccant causes the delay of moisture permeation through the sealant/adhesive. Moreover, no loss of adhesion or other mechanical properties was observed in the formulations containing the desiccants.

Example 5

Figure 3:
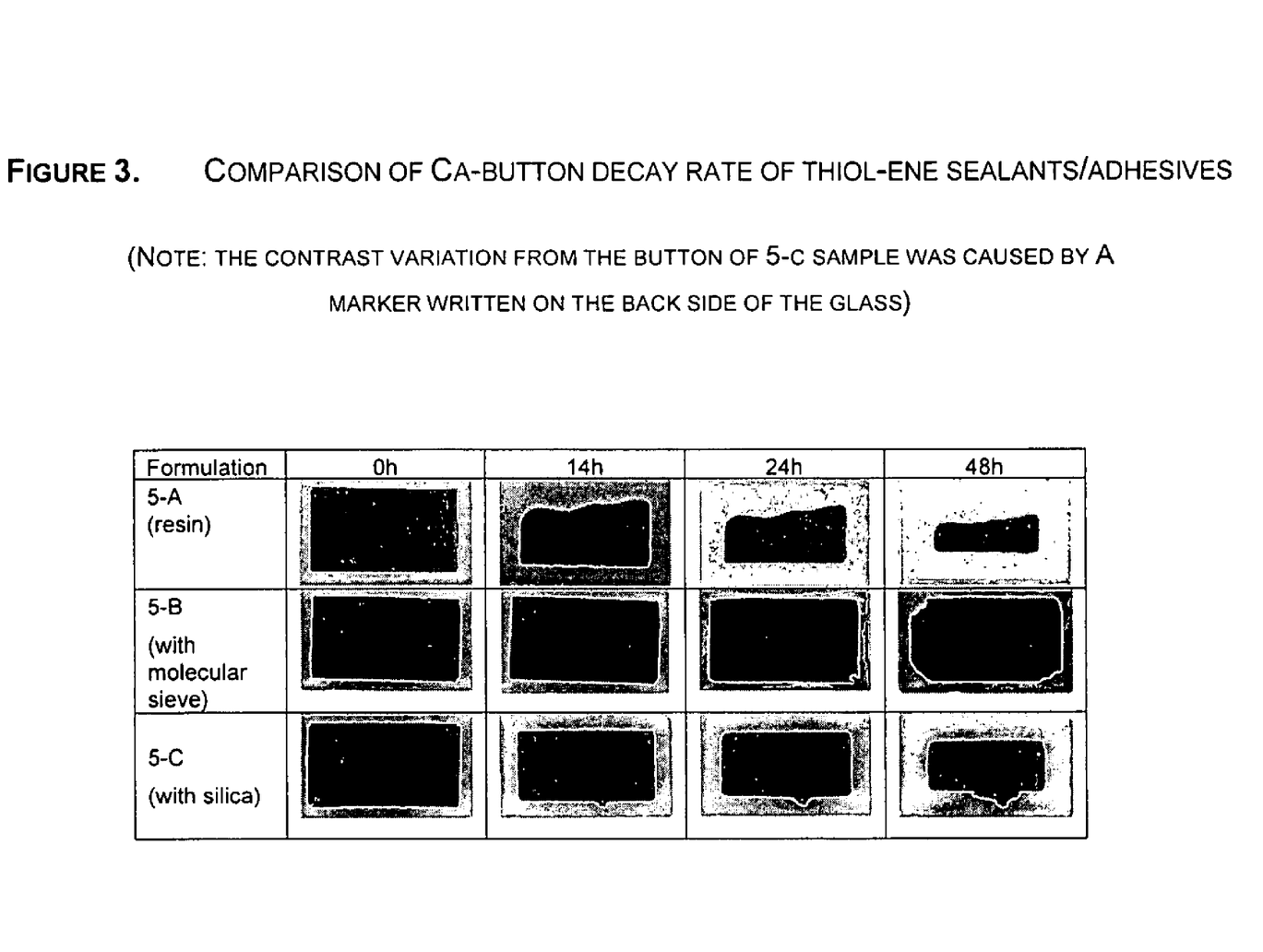
FIG. 3 shows a comparison of Ca-button decay rate of thiol-ene sealants/adhesives.

The benefit of desiccant filler was further demonstrated in a thiol-ene based system. Several thiol-ene formulations were prepared and are listed in Table 3. The Ca-button button devices were prepared and tested using the same method described above. Formulation 5-b exhibited the slowest decay among all samples due to the addition of desiccant filler as shown in FIG. 3.

TABLE 3

Sealant 5(a) (without Desiccant), 5(b) (with Molecular Sieves), and 5(c) (with Spherical Silica)

| Component | Parts by Weight 2-a | 2-b | 2-c |
|---|---|---|---|
| Q43 | 2.96 | 2.96 | 2.96 |
| TAIC | 1.93 | 1.93 | 1.93 |
| (3-Mercaptopropyl)Trimethoxysilane | 0.15 | 0.15 | 0.15 |
| Irgacure 651 | 0.097 | 0.097 | 0.097 |
| Irganox 3052 | 500 ppm based on total resin | | |
| Molecular sieves |  | 2.5 |  |
| Micron sized silica |  |  | 2.5 |

Irganox 3052 (product of Ciba) has the structure:

Q43 (product of Hampshire Chemical) has the structure;

TAIC (product of Aldrich) has the structure:

Irgacure 651 (product of Ciba) has the structure:

Example 6

Two maleimide-based systems were compared. Sealant 6-a was a pure resin blend while sealant 6-b contained 30 wt % calcium sulfate (based on total weight) prepared similarly to example 4. Both samples were cured with 3J UVA and the moisture permeation was tested at 50° C., 100% relative humidity. Sealant 6-b was found to have significantly lower moisture permeation. The results are disclosed in TABLE 4.

TABLE 4

SEALANT 6-A (WITHOUT DESICANT) AND 6-B (WITH DESICCANT)
TABLE 4: SEALANT 6-a (WITHOUT DESICCANT)
SEALANT 6-b (WITH DESICCANT)

| COMPONENT | PARTS BY WEIGHT | |
|---|---|---|
| | 6-a | 6-b |
| Maleimide resin X | 80 | 80 |
| Maleimide resin Y | 20 | 20 |
| Irgacure 651 | 2 | 2 |
| Calcium sulfate | 0 | 43 |
| Moisture permeation at 50° C./100% RH (g · mil/100 in² · day) | 116 | 61 |

Maleimide resin X

Maleimide resin Y

Example 7

Desiccant-filled cationic epoxy barrier sealants were prepared to contain resorcinol diglycidyl ether (RDGE), EPON 862, a photoinitiating system (cationic photoinitiator and ITX), and a silane adhesion promoter as disclosed in Table 5. Samples were placed in a plastic jar and mixed with a vortex mixer for one hour until clear. Calcium sulfate, micron sized silica were then added to the jar and the whole sample was mixed for another hour with the vortex mixer. The resulting paste was degassed in a vacuum chamber.

The shear adhesion of the cured samples was tested using a Royce Instrument 552 100K equipped with a 100 kg head and a 300 mil die tool. The adhesion was found to be 26.0±4.6 kg for formulation 7(a) and 39.3±10.2 kg for sealant formulation 7(b). After hygrothermal aging at 65° C. and 80% RH, the adhesion of 7(a) was found to be 31.4±7.2 at one week and 27.5±1.9 at two weeks, and the adhesion of 7(b) was found to be 37.3±4.7 at one week and 36.5±2.0 at two weeks.

Moisture permeation coefficient (50° C., 100% relative humidity) of the above formulations were measured with Mocon Permeatran 3/33 and was found to be 5.1 g-mil/ 100 in²-day for formulation 7(a) and 3.0 g mil/100 in²-day for formulation 7(b).

TABLE 5

Sealant 7(a) (with desiccant) and 7(b) (without desiccant)

| Component | Parts by Weight | |
|---|---|---|
| | 7(a) | 7(b) |
| RDGE | 18.36 | 18.36 |
| EPON 862 | 18.36 | 18.36 |
| SR1012 | 0.74 | 0.74 |
| ITX | 0.26 | 0.26 |
| Silane Adhesion Promoter | 1.27 | 1.27 |
| Calcium sulfate | 15.20 | |
| Micron sized silica | 45.81 | 72.27 |
| Total filler | 61.01 | 72.27 |
| Total: | 100.00 | 111.25 |

Figure 4:
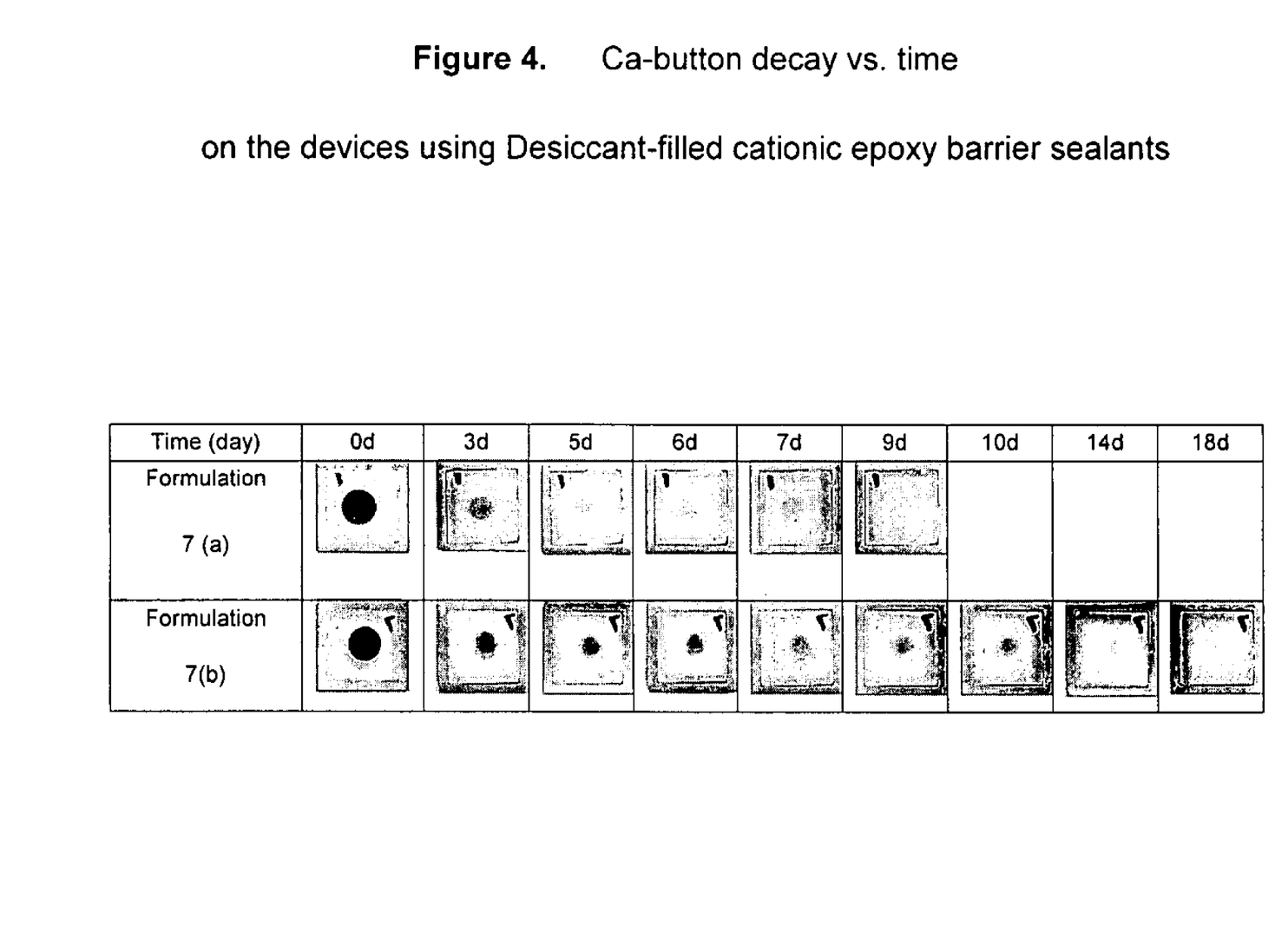
FIG. 4 shows Ca-button decay over time on devices using desiccant filled cationic epoxy barrier sealants.

The Ca-button testing was performed on the formulations 7(a) and 7(b) using the same method described with the examples 1, 2, and 3. The adhesive was cured with 6 J UVA through the glass wafer. After sitting overnight in the drybox, the samples were placed in a humidity chamber at 65° C. and 80% RH. The disappearance of the calcium buttons was monitored until the samples were completely transparent (FIG. 4). As the "calcium button test" indicated, even though sealant 7(b) has better adhesion, and more inorganic filler loading and thus lower moisture permeation than 7(a), the encapsulated calcium film of 7(a) survived much longer than that in 7(b) because calcium sulfate desiccant was used in 7(a). This clearly demonstrates the value of having desiccants in an epoxy-based formulation.

Example 8

Ca Button Lifetime of a Desiccant Filled Epoxy which Does Not Possess Meta-Substitution This example shows that the epoxy composition, provided in Example 7, is important for making a high performance barrier sealant. In particular it is important to have low bulk permeability and high shear strength after hygrothermal aging in order to provide long device lifetime.

A desiccant-filled epoxy formulation based on the diglycidyl ether of bisphenol F was formulated as given below:

| resin or filler | Parts |
|---|---|
| Epon 862 (BPFDGE) | 24.7 |
| cycloaliphatic vinyl ether | 17.2 |
| silane adhesion promoter | 0.2 |
| sulfonium salt photoinitiator | 0.9 |
| fumed silica thixotrope | 2 |
| micron-sized silica | 27.5 |
| powdered 4 angstrom molecular sieves (<5 micron average particle diameter) | 27.5 |

The composition was manually blended and then milled briefly on a three roll mill. A 4 mil film of the composition was formed using a drawdown bar and cured with a UV dose of 3 J UVA/cm$^2$. The permeability was measured using a Mocon Permatran instrument at 50° C./100% RH. The permeation coefficient was ca. 19 g-mil/100 in$^2$0.24 h.

The composition was used to bond a 4 mm×4 mm square sodalime glass die to a sodalime glass substrate with an adhesive layer thickness of ca. 2 mi, and was UV cured using a radiation dose of 3J UVA/cm$^2$. The initial die shear strength of this composition was 27.1 kg when tested using the same methodology as that described in Example 7. After aging for one week at 65° C./805 RH, the shear strength of the composition had decreased to average values below 10 kg.

The Ca button lifetime was measured in a way similar to that described in Example 7. A 100 nm thick Ca button was deposited on a sodalime glass wafer, and a stainless steel lid (ca. 25 mm×25 mm square, lip width ca. 1 mm) was adhered over the Ca button using the adhesive formulation of this example. The button lifetime was measured at 65° C./80% RH as in Example 7 and was found to be ca. 15 hours.

Thus, it was observed that the desiccant-filled epoxy formulation of the current example exhibited poorer adhesion after hygrothermal aging, higher bulk permeability, and poorer Ca button lifetime relative to the meta-substituted epoxy system of example 7. This example illustrates that the choice of both epoxy resin and desiccant is important in order to obtain a high performance desiccant-filled epoxy sealant. In particular, meta-substituted epoxy systems, such as those exemplified in Example 7, with low inherent moisture permeability and good adhesion (both before and after hygrothermal aging) are important to obtain long device lifetimes.

What is claimed:

1. An electrophoretic device comprising a radiation-curable desiccant-filled adhesive/sealant composition consisting essentially of:
   a) a radiation-curable resin,
   b) one or more desiccant fillers,
   c) a photoinitiating system comprising one or more photoinitiators and optionally one or more photosensitizers,
   d) optionally, a radiation curable resin diluent.

2. The electrophoretic device in accordance with claim 1 in which radiation-curable desiccant-filled adhesive/sealant in accordance with claim 1 in which the radiation-curable resin contains reactive functionality selected from the group consisting of glycidyl epoxy, aliphatic epoxy, cycloaliphatic epoxy; oxetane; acrylate, methacrylate, itaconate; maleimide; ethers of vinyl, proenyl, crotyl, allyl, and propargyl groups; thio-ethers of vinyl, pronenyl, crotyl, allyl, and propargyl groups; maleate, fumarate, and cinnamate esters; styrenic; acrylamide and methacrylamide; chalcone; thiol; allyl, alkenyl, and cycloalkenyl groups.

3. The electrophoretic device in accordance with claim 1 in which the one or more desiccant fillers are selected from the group consisting of metal oxides, metal sulfates, metal hydrides, metal halides, metal perchlorates, metal carbonates, phosphorus pentoxide, metals that react with water, superabsorbant polymers, zeolites, molecular sieves, activated alumina, activated silica gel, and combinations thereof.

4. The electrophoretic device in accordance with claim 3 in which the desiccant fillers are selected from the group consisting of CaO, BaO, MgO, SiO$_2$, P$_2$O$_5$, Al$_2$O$_3$, CaH$_2$, NaH, LiAlH$_4$, CaSO$_4$, Na$_2$SO$_4$, MgSO$_4$, CaCO$_3$, K$_2$CO$_3$, CaCl$_2$, 4A and 3A molecular sieves, Ba(ClO$_4$)$_2$, Mg(ClO$_4$)$_2$,, lightly crosslinked poly(acrylic acid) and Ca.

5. The electrophoretic device in accordance with claim 1 in which the adhesive/sealant composition is disposed on a substrate and encapsulated with a lid in which the lid and the substrate are bonded together, wherein said adhesive/sealant composition is disposed along the perimeter of the substrate and the lid.

6. The electrophoretic device in accordance with claim 1 in which the adhesive/sealant composition is disposed on a substrate and encapsulated with a lid in which the lid and the substrate are bonded together, wherein said adhesive/sealant composition is disposed in the whole area between the substrate and the lid.

7. The electrophoretic device in accordance with claim 2 in which the radiation-curable resin is a polyisobutylene or butyl rubber.

8. The electrophoretic device in accordance with claim 2 in which the radiation-curable resin is a thiol-ene resin.

9. The electrophoretic device in accordance with claim 8 in which the thiol-ene resin is a pentaerythritol-tetrakis (3-mercaptopropionate)/triallyl-isocyanurate system.

10. The electrophoretic device in accordance with claim 2 in which the radiation-curable resin is a maleimide resin.

11. The electrophoretic device in accordance with claim 10 in which the maleimide resin is -continued 12. The electrophoretic device in accordance with claim 2 in which the radiation-curable resin is an epoxy resin.

13. The electrophoretic device of claim 12, wherein said epoxy resin is resorcinol diglycidyl ether.

* * * * *